United States Patent
Wu

(10) Patent No.: US 9,166,749 B2
(45) Date of Patent: *Oct. 20, 2015

(54) SERIAL DATA TRANSMISSION SYSTEM AND METHOD

(71) Applicant: IPGoal Microelectronics (Sichuan) Co., Ltd., Chengdu, Sichuan (CN)

(72) Inventor: Zhaolei Wu, Sichuan (CN)

(73) Assignee: IPGoal Microelectronics (Sichuan) Co., Ltd., Chengdu, Sichuan Province (CN)

( * ) Notice: Subject to any disclaimer, the term of this patent is extended or adjusted under 35 U.S.C. 154(b) by 66 days.

This patent is subject to a terminal disclaimer.

(21) Appl. No.: 14/079,384

(22) Filed: Nov. 13, 2013

(65) Prior Publication Data

US 2014/0133532 A1    May 15, 2014

(30) Foreign Application Priority Data

Nov. 13, 2012 (CN) .......................... 2012 1 0452687

(51) Int. Cl.
*G06F 3/00* (2006.01)
*G06F 13/00* (2006.01)
*G06F 13/42* (2006.01)
*H04L 1/24* (2006.01)

(52) U.S. Cl.
CPC .............. *H04L 1/24* (2013.01); *Y02B 60/1228* (2013.01); *Y02B 60/1235* (2013.01)

(58) Field of Classification Search
CPC ............ G06F 3/00; G06F 13/42; G06F 17/40
USPC ........................................ 710/17, 15, 35, 106
See application file for complete search history.

(56) References Cited

U.S. PATENT DOCUMENTS

| | | | |
|---|---|---|---|
| 6,870,390 B1 * | 3/2005 | Groen et al. .................... 326/27 |
| 2005/0077930 A1 * | 4/2005 | Masuda ......................... 327/113 |
| 2010/0321069 A1 * | 12/2010 | Komatsu et al. ............... 327/108 |
| 2011/0187415 A1 * | 8/2011 | Kurimoto ....................... 327/103 |
| 2012/0001678 A1 * | 1/2012 | Feng ............................. 327/517 |
| 2013/0207677 A1 * | 8/2013 | Togura .......................... 324/685 |

* cited by examiner

*Primary Examiner* — Idriss N Alrobaye
*Assistant Examiner* — Getente A Yimer

(57) ABSTRACT

A serial data transmission system includes a sending terminal for sending data, a receiving terminal for receiving the data sent by the sending terminal, a first connecting capacitor connected between the sending terminal and the receiving terminal, and a second connected capacitor connected between the sending terminal and the receiving terminal. The sending terminal includes a sending terminal driving unit, and an amplitude detecting unit connected to the sending terminal driving unit. The sending terminal driving unit outputs a pair of differential signals according to signals of the received data. The amplitude detecting unit detects changes in amplitudes of the differential signals outputted by the sending terminal driving unit, and outputs an indicating signal for indicating whether the sending terminal is properly connected to the receiving terminal. A serial data transmission method is further provided.

6 Claims, 3 Drawing Sheets

SERIAL DATA TRANSMISSION SYSTEM AND METHOD

CROSS REFERENCE OF RELATED APPLICATION

This invention claims priority under 35 U.S.C. 119(a-d) to CN 201210452687.3, filed Nov. 13, 2012.

BACKGROUND OF THE PRESENT INVENTION

1. Field of Invention

The present invention relates to data transmission system and method, and more particularly to a serial data transmission system having an amplitude detection unit and a method thereof.

2. Description of Related Arts

In the serial data transmission system, before the high-speed data transmission, the sending terminal of the electronic equipment needs to check whether the receiving terminal of the equivalent is properly connected to the sending terminal of the electronic equipment; the high-speed data transmission is initiated only when the sending terminal of the electronic equipment detects the proper connection to the receiving terminal of the equivalent.

Thus, the sending terminal of the electronic equipment is required to have a detection circuit which is capable of detecting whether the sending terminal of the electronic equipment is properly connected to the receiving terminal. Because the peripheral circuit of the serial data transmission system changes relatively significantly, especially because of the alternating current coupling device and the on-board parasitic circuit of the plate electrode channel and the uncertain impedance of the receiving terminal, in the design of the detection circuit, the system needs a high resistance to interference, precise judgment range and possibly low power consumption, so as to satisfy the future low consumption applications.

Thus, it is necessary to provide an improved serial data transmission system or method to overcome the above defects.

SUMMARY OF THE PRESENT INVENTION

An object of the present invention is to provide a serial data transmission system having an amplitude detection unit and a method thereof, wherein the serial data transmission system has a simple structure, high resistance to interference and low power consumption.

Accordingly, in order to accomplish the above objects, the present invention provides a serial data transmission system comprising: a sending terminal for sending data, a receiving terminal for receiving the data sent by the sending terminal, a first connecting capacitor which is connected between the sending terminal and the receiving terminal, and a second connecting capacitor which is connected between the sending terminal and the receiving terminal. The sending terminal comprises a sending terminal driving unit and an amplitude detecting unit which is connected to the sending terminal driving unit, wherein, the sending terminal driving unit outputs a pair of differential signals according to signals of the data which are received by the sending terminal driving unit; and the amplitude detecting unit detects changes in amplitudes of the pair of differential signals which is outputted by the sending terminal driving unit, and outputs an indicating signal for indicating whether the sending terminal is properly connected to the receiving terminal.

Preferably, the amplitude detecting unit comprises an amplitude detecting circuit, a reference voltage generating circuit, a reference voltage terminal which is connected to the reference voltage generating circuit, and a comparator which is connected to the amplitude detecting circuit and the reference voltage terminal. The amplitude detecting circuit detects the changes in the amplitudes of the pair of differential signals which is outputted by the sending terminal driving unit, and outputs a voltage value into the comparator, wherein the voltage value is directly proportional to the changes in the amplitudes of the pair of differential signals. The comparator compares the voltage value which is outputted by the amplitude detecting circuit with a voltage value of the reference voltage terminal, and outputs the indicating signal for indicating whether the sending terminal is properly connected to the receiving terminal. The receiving terminal comprises a first resistor which is connected to the first connecting capacitor, and a second resistor which is connected to the second connecting capacitor.

Preferably, the sending terminal driving unit comprises a first current source, a first field effect transistor (FET), a second FET which is connected to the first current source, a third resistor which is connected to the first FET, and a fourth resistor which is connected to the second FET. The amplitude detecting circuit comprises a fourth current source, a fifth current source, a third FET which is connected to the first FET and the third resistor, a fourth FET which is connected to the second FET and the fourth resistor, an eighth FET, a fifth resistor which is connected to the fourth current source, a sixth resistor which is connected to the fifth current source, a seventh resistor which is connected to the fourth FET, an eighth resistor which is connected to the third FET, a ninth resistor which is connected to the third FET, a tenth resistor which is connected to the fourth FET, a third capacitor which is connected to the fifth resistor, and a fourth capacitor which is connected to the sixth resistor. The reference voltage generating circuit comprises a second current source, a third current source, a fifth FET, a sixth FET connected to the fifth FET, a seventh FET which is connected to the fifth FET and the sixth FET, an eleventh resistor which is connected to the fifth FET, a twelfth resistor which is connected to the sixth FET, a thirteenth resistor which is connected to the second current source, a fourteenth resistor which is connected to the third current source, a fifteenth resistor which is connected to the thirteenth resistor, a sixteenth resistor which is connected to the fourteenth resistor, a fifth capacitor which is connected to the fifteenth resistor, and a sixth capacitor which is connected to the sixteenth resistor.

Preferably, a first terminal of the first current source, a first terminal of the second current source, a first terminal of the third current source, a first terminal of the fourth current source, a first terminal of the fifth current source, a first terminal of the seventh resistor, a first terminal of the eighth resistor, a first terminal of the eleventh resistor and a first terminal of the twelfth resistor are all connected to a power source; a source electrode of the first FET and a source electrode of the second FET are both connected to a second terminal of the first current source; a gate electrode of the first FET and a gate electrode of the second FET together receive a pair of inputted differential data; a drain electrode of the first FET is respectively connected to a first terminal of the third resistor, a first terminal of the first connecting capacitor, a gate electrode of the third FET, and a first terminal of the ninth resistor; a drain electrode of the second FET is respectively connected to a first terminal of the fourth resistor, a first terminal of the second connecting capacitor, a gate electrode of the fourth FET, and a first terminal of the tenth resistor; the drain electrode of the first FET and the drain electrode of the second FET together outputs a pair of differential signals into the gate electrode of the third FET and the gate electrode of the fourth FET.

Preferably, a second terminal of the first connecting capacitor is connected to a first terminal of the second resistor; a second terminal of the second connecting capacitor is connected to a first terminal of the first resistor; a drain electrode of the third FET is connected to a second terminal of the eight resistor; a drain electrode of the fourth FET is connected to a second terminal of the seventh resistor; a source electrode of the third FET, a source electrode of the fourth FET, a drain electrode of the eight FET, a first terminal of the fifth resistor, a first terminal of the sixth resistor, a first terminal of the third capacitor and a first terminal of the fourth capacitor are all connected to a detection voltage terminal; a second terminal of the fifth resistor is connected to a second terminal of the fourth current source; a second terminal of the sixth resistor is connected to a second terminal of the fifth current source.

Preferably, a second terminal of the ninth resistor and a second terminal of the tenth resistor are both connected to a gate electrode of the fifth FET and a gate electrode of the sixth FET, and output a common-mode signal into the gate electrode of the fifth FET and the gate electrode of the sixth FET; a drain electrode of the fifth FET is connected to a second terminal of the eleventh resistor; a drain electrode of the sixth FET is connected to a second terminal of the twelfth resistor; a source electrode of the fifth FET, a source electrode of the sixth FET, a drain electrode of the seventh FET, a first terminal of the fifteenth resistor, a first terminal of the sixteenth resistor, a first terminal of the fifth capacitor and a first terminal of the sixth capacitor are all connected together.

Preferably, a gate electrode of the seventh FET is connected to a gate electrode of the eighth FET; the gate electrode of the seventh FET and the gate electrode of the eighth FET together are connected to a voltage terminal; a first terminal of the thirteenth resistor is connected to a second terminal of the second current source; a first terminal of the fourteenth resistor is connected to a second terminal of the third current source; a second terminal of the thirteenth resistor and a second terminal of the fifteenth resistor are both connected to the reference voltage terminal; a second terminal of the fourteenth resistor is connected to a second terminal of the sixteenth resistor.

Preferably, a second terminal of the first resistor, a second terminal of the second resistor, a second terminal of the third resistor, a second terminal of the fourth resistor, a second terminal of the third capacitor, a second terminal of the fourth capacitor, a second terminal of the fifth capacitor, a second terminal of the sixth capacitor, a source electrode of the seventh FET and a source electrode of the eighth FET are all connected to a ground terminal; a non-inverting input terminal of the comparator is connected to the detection voltage terminal; an inverting input terminal of the comparator is connected to the reference voltage terminal; an output terminal of the comparator outputs the indicating signal for indicating whether the sending terminal is properly connected to the receiving terminal.

Accordingly, the present invention further provides a serial data transmission method, for transmitting differential data which are received by a sending terminal into a receiving terminal. The serial data transmission method of the present invention comprises steps of:

receiving a pair of differential data by a sending terminal;

initiating an amplitude detecting unit of the sending terminal;

according to the received differential data, outputting a pair of differential signals into an amplitude detecting circuit of an amplitude detecting unit by a sending terminal driving unit of the sending terminal;

detecting changes in amplitudes of the received differential signals, and outputting a detection voltage value into a non-inverting input terminal of a comparator of the amplitude detecting unit, wherein the detection voltage value is directly proportional to a voltage value of the received differential signals which deviates from a common mode voltage, by the amplitude detecting circuit;

inputting a reference voltage value into an inverting input terminal of the comparator by a reference voltage terminal;

outputting an indicating signal for indicating whether the terminal is properly connected to a receiving terminal by an output terminal of the comparator; and when the sending terminal is properly connected to the receiving terminal, transmitting the received differential data into the receiving terminal by the sending terminal.

Preferably, the differential data which are received by the sending terminal are serial data which need to be transmitted into the receiving terminal by the sending terminal; when the amplitude detecting unit is initiated, the differential data which are received by the ending terminal are to-be-detected data having a certain frequency, and the frequency of the to-be-detected data is adjusted desirably.

Compared with prior arts, the serial data transmission system and method, provided by the present invention, detect the amplitude changes with the amplitude detecting unit, wherein the amplitude changes are generated by the data which are transmitted by the sending terminal, generate the detection voltage value which is directly proportional to the amplitude changes which are generated by the transmitted data, and detect whether the sending terminal is properly connected to the receiving terminal by comparing the detection voltage value with the reference voltage value. Thus the serial data transmission system and method have advantages of a simple structure, high resistance to interference and low power consumption.

These and other objectives, features, and advantages of the present invention will become apparent from the following detailed description, the accompanying drawings, and the appended claims.

DETAILED DESCRIPTION OF THE PREFERRED EMBODIMENT

Figure 1:
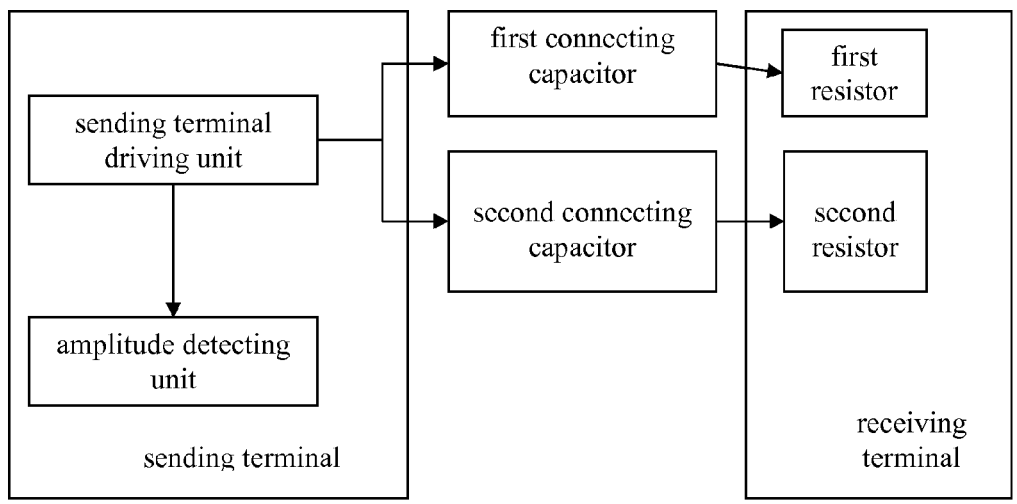
FIG. 1 is a block diagram of a serial data transmission system according to a preferred embodiment of the present invention.
Figure 3:
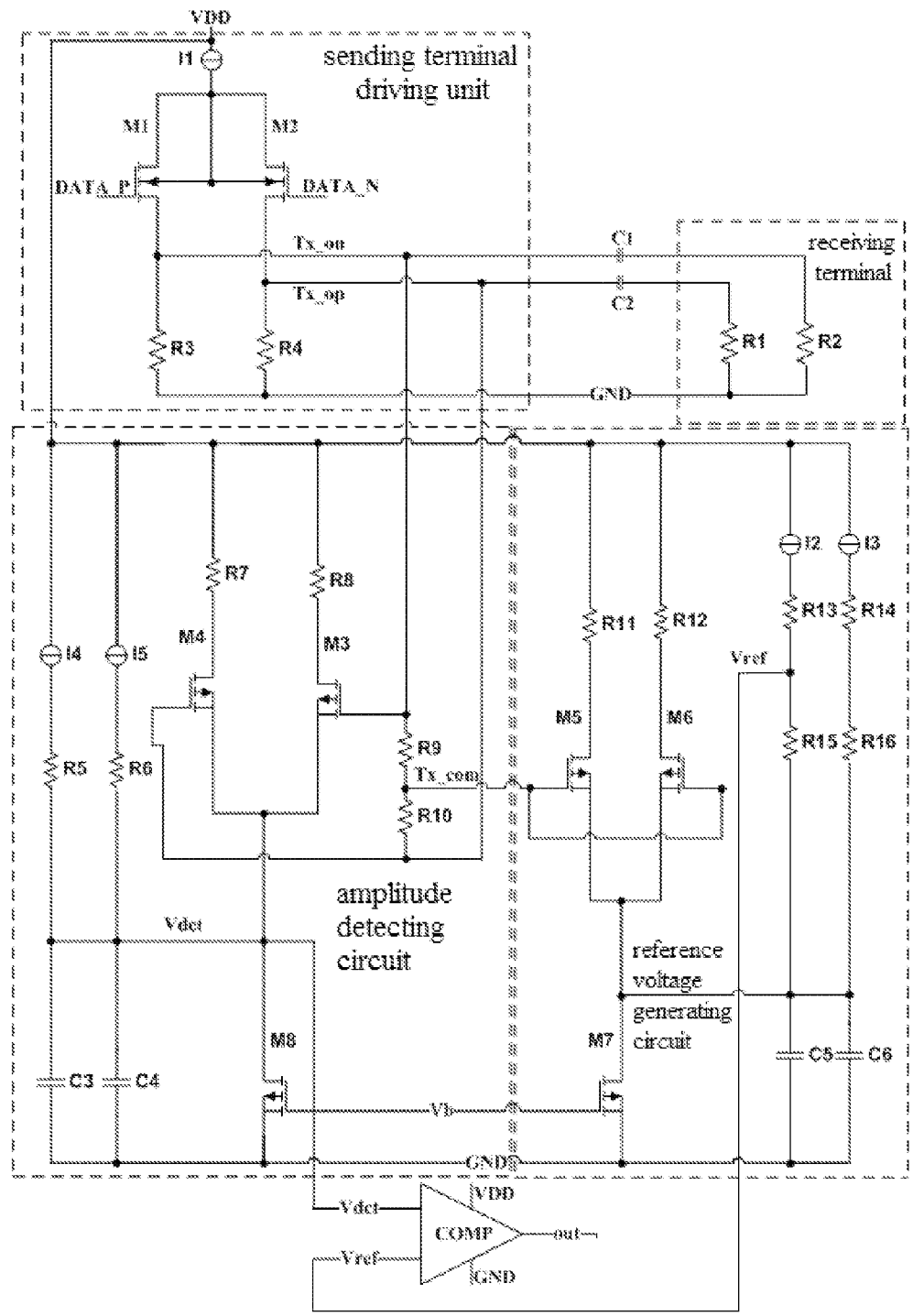
FIG. 3 is a circuit diagram of the serial data transmission system according to the preferred embodiment of the present invention.

Referring to FIGS. 1 and 3 of the drawings, according to a preferred embodiment of the present invention, a serial data transmission system comprises a sending terminal, a receiving terminal, a first connecting capacitor C1 which is connected between the sending terminal and the receiving terminal, and a second connecting capacitor C2 which is connected between the sending terminal and the receiving terminal. The sending terminal comprises a sending terminal driving unit, and an amplitude detecting unit which is connected to the sending terminal driving unit. The receiving terminal comprises a first resistor which is connected to the first connecting capacitor C1, and a second resistor which is connected to the second connecting capacitor C2.

The sending terminal driving unit outputs a pair of differential signals, Tx_on and Tx_op, according to data signals which are received by the sending terminal driving unit. The amplitude detecting unit detects changes in amplitudes of the signals Tx_on and Tx_op which are outputted by the sending terminal driving unit, and outputs an indicating signal for indicating whether the sending terminal is properly connected to the receiving terminal. The first connecting capacitor C1 and the second connecting capacitor C2 are both alternating coupling capacitors for isolating direct current signals and only permitting alternating current signals to pass. The first resistor R1 and the second resistor R2 are load impedances of the receiving terminal; the first resistor R1 and the second resistor R2 are both connected to ground.

Figure 2:
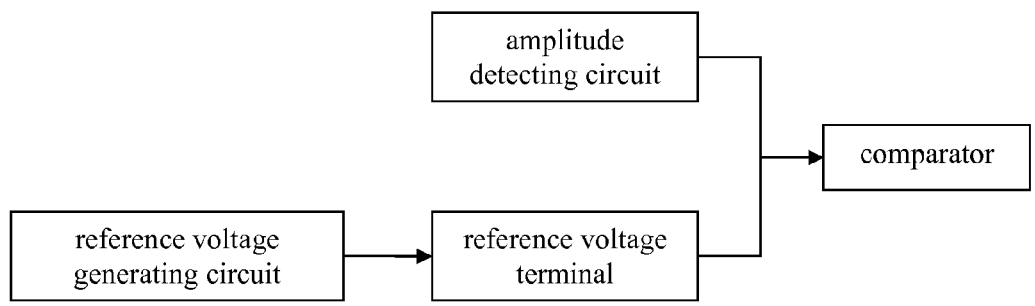
FIG. 2 is a block diagram of an amplitude detecting unit of the serial data transmission system according to the preferred embodiment of the present invention.

Referring to FIG. 2, according to the preferred embodiment of the present invention, an amplitude detecting unit of the serial data transmission system is showed. Further referring to FIG. 3, the amplitude detecting unit comprises an amplitude detecting circuit, a reference voltage generating circuit, a reference voltage terminal Vref which is connected to the reference voltage generating circuit, and a comparator COMP which is connected to the amplitude detecting circuit and the reference voltage terminal Vref. The amplitude detecting circuit is for detecting the changes in the amplitudes of the differential signals which are outputted by the sending terminal driving unit, and outputting a voltage value into the comparator COMP, wherein the voltage value is directly proportional to the changes in the amplitudes of the differential signals. The reference voltage generating circuit is for generating desired reference voltage and sending the desired reference voltage into the reference voltage terminal Vref. The comparator COMP is for comparing the voltage value which is outputted by the amplitude detecting circuit with the voltage value of the reference voltage terminal Vref, and outputting the indicating signal for indicating whether the sending terminal is properly connected to the receiving terminal.

Referring to FIG. 3, a circuit diagram of the serial data transmission system is specifically showed. The sending terminal driving unit comprises a first current source I1, a first FET M1 which is connected to the first current source I1, a second FET M2 which is connected to the first current source I1, a third resistor R3 which is connected to the first FET M1, and a fourth resistor R4 which is connected to the second FET M2. The amplitude detecting circuit comprises a fourth current source I4, a fifth current source I5, a third FET M3, a fourth FET M4, an eighth FET M8, a fifth resistor R5, a sixth resistor R6, a seventh resistor R7, an eighth resistor R8, a ninth resistor R9, a tenth resistor R10, a third capacitor C3 and a fourth capacitor C4. The reference voltage generating circuit comprises a second current source I2, a third current source I3, a fifth FET M5, a sixth FET M6, a seventh FET M7, an eleventh resistor R11, a twelfth resistor R12, a thirteenth resistor R13, a fourteenth resistor R14, a fifteenth resistor R15, a sixteenth resistor R16, a fifth capacitor C5 and a sixth capacitor C6.

According to the preferred embodiment of the present invention, the circuit of the serial data transmission system comprises following specific connections. A first terminal of the first current source I1, a first terminal of the second current source I2, a first terminal of the third current source I3, a first terminal of the fourth current source I4, a first terminal of the fifth current source I5, a first terminal of the seventh resistor R7, a first terminal of the eighth resistor R8, a first terminal of the eleventh resistor R11 and a first terminal of the twelfth resistor R12 are all connected to a power source terminal VDD. A source electrode of the first FET M1 and a source electrode of the second FET M2 are both connected to a second terminal of the first current source I1; a gate electrode of the first FET M1 and a gate electrode of the second FET M2 together receive a pair of inputted differential data, DATA_P and DATA_N. A drain electrode of the first FET M1 is respectively connected to a first terminal of the third resistor R3, a first terminal of the first connecting capacitor C1, a gate electrode of the third FET M3 and a first terminal of the ninth resistor R9. A drain electrode of the second FET M2 is respectively connected to a first terminal of the fourth resistor R4, a first terminal of the second connecting capacitor C2, a gate electrode of the fourth FET M4 and a first terminal of the tenth resistor R10. A drain electrode of the first FET M1 and a drain electrode of the second FET M2 together output the pair of differential signals Tx_on and Tx_op into a gate electrode of the third FET M3 and a gate electrode of the fourth FET M4. A second terminal of the first connecting capacitor C1 is connected to a first terminal of the second resistor R2; a second terminal of the second connecting capacitor C2 is connected to a first terminal of the first resistor R1. A drain electrode of the third FET M3 is connected to a second terminal of the eighth resistor R8; a drain electrode of the fourth FET M4 is connected to a second terminal of the seventh resistor R7; a source electrode of the third FET M3, a source electrode of the fourth FET M4, a drain electrode of the eighth FET M8, a first terminal of the fifth resistor R5, a first terminal of a sixth resistor R6, a first terminal of the third capacitor C3 and a first terminal of the fourth capacitor C4 are all connected to a detection voltage terminal Vdct. A second terminal of the fifth resistor R5 is connected to a second terminal of the fourth current source I4; and a second terminal of the sixth resistor R6 is connected to a second terminal of the fifth current source I5. A second terminal of the ninth resistor R9 and a second terminal of the tenth resistor R10 together are connected to a gate electrode of the fifth FET M5 and a gate electrode of the sixth FET M6, and output a common-mode signal Tx_com into the gate electrode of the fifth FET M5 and the gate electrode of the sixth FET M6. A drain electrode of the fifth FET M5 is connected to a second terminal of the eleventh resistor R11; and a drain electrode of the sixth FET M6 is connected to a second terminal of the twelfth resistor R12. A source electrode of the fifth FET M5, a source electrode of the sixth FET M6, a drain electrode of the seventh FET M7, a first terminal of the fifteenth resistor R15, a first terminal of the sixteenth resistor R16, a first terminal of the fifth capacitor C5 and a first terminal of the sixth capacitor C6 are connected together. A gate electrode of the seventh FET M7 is connected to a gate electrode of the eighth FET M8; the gate electrode of the seventh FET M7 and the gate electrode of the eighth FET M8 are both connected to a voltage terminal Vb. A first terminal of the thirteenth resistor R13 is connected to a second terminal of the second current source I2; a first terminal of the fourteenth resistor R14 is connected to a second terminal of the third current source I3; a second terminal of the thirteenth resistor R13 and a second terminal of the fifteenth resistor R15 are both connected to a reference voltage terminal Vref; a second terminal of the fourteenth resistor R14 is connected to a second terminal of the sixteenth resistor R16. A second terminal of the first resistor R1, a second terminal of the second resistor R2, a second terminal of the third resistor R3, a second terminal of the fourth resistor R4, a second terminal of the third capacitor C3, a second terminal of the fourth capacitor C4, a second terminal of the fifth capacitor C5, a second terminal of the sixth capacitor C6, a source electrode of the seventh FET M7 and a source electrode of the eighth FET M8 are all connected to a ground terminal GND. A non-inverting input terminal of the comparator COMP is connected to the detection voltage terminal Vdct; an inverting input terminal of the comparator COMP is connected to the reference voltage terminal Vref; an output terminal OUT of the comparator COMP outputs the indicating signal for indicating whether the sending terminal is properly connected to the receiving terminal; a first voltage terminal of the comparator COMP is connected to the power source terminal VDD; and a second voltage terminal of the comparator COMP is connected to the ground terminal GND.

According to the preferred embodiment of the present invention, the serial data transmission system has following working principles.

Referring to FIG. 3, the differential data DATA_P and DATA_N are serial data which need to be transmitted by the sending terminal of the serial data transmission system; when the amplitude detecting unit is initiated, the differential data DATA_P and DATA_N are to-be-detected data having a certain frequency and the frequency of the to-be-detected data is adjusted desirably.

Supposing that the differential signals Tx_on and Tx_op respectively have output amplitudes of:

$$V_{Tx\_on} = V_{Tx\_com} + \Delta V, V_{Tx\_op} = V_{Tx\_com} - \Delta V;$$

wherein a common-mode voltage $$V_{Tx\_com} = \frac{1}{2} I1 \times R4;$$

$\Delta V$ is a voltage value by which the differential signals Tx_on and Tx_op deviate from the common-mode voltage, i.e., the amplitude of the signal outputted by the sending terminal.

Herein, a sum of currents running through the third FET M3 and the fourth FET M4 is showed as an equation of:

$$I_{M3} + I_{M4} = K(V_{Tx\_op} - V_{dct} - V_{th})^2 + K(V_{Tx\_on} - V_{dct} - V_{th})^2 = K(V_b - V_{th})^2 - I_4 - I_5.$$

From the above equation, a voltage value Vdct of the detection voltage terminal Vdct changes with $\Delta V$ according to an equation of:

$$V_{dct} \approx \frac{(V_{th} - V_{Tx\_com}) + \sqrt{(V_{th} - V_{Tx\_com})^2 + 4\Delta V}}{2};$$

$$V_{dct} \propto \Delta V,$$

which means the voltage value Vdct of the detection voltage terminal Vdct is directly proportional to the voltage value $\Delta V$ by which the differential signals Tx_on and Tx_op deviate from the common-mode voltage.

In the above equations, K is a proportion coefficient and $$K = \frac{1}{2} \mu C_{ox} \frac{W}{L};$$

$\mu$ is a mobility of the FETs; Cox is a gate oxide thickness of the FETs;

$$\frac{W}{L}$$

is a width to length ratio of the third FET M3 and the fourth FET M4; Vth is a threshold voltage of the FETs.

The above equations indicate that the voltage value Vdct of the detection voltage terminal Vdct increases with the increasing voltage value $\Delta V$ by which the differential signals Tx_on and Tx_op deviate from the common-mode voltage.

When the sending terminal detects out that the sending terminal is properly connected to the receiving terminal, the voltage value by which the differential signals, Tx_on and Tx_op, deviate from the common-mode voltage is $\Delta V1$, and the voltage value of the detection voltage terminal Vdct is Vdct1. When the sending terminal detects out that the sending terminal is improperly connected to the receiving terminal, the voltage value by which the differential signals, Tx_on and Tx_op, deviate from the common-mode voltage is $\Delta V2$, and the voltage value of the detection voltage terminal Vdct is Vdct2.

When the sending terminal detects out that the sending terminal is properly connected to the receiving terminal, $$\Delta V1 = \frac{1}{2} I1 \times \frac{R1 \times R4}{R1 + R4};$$

when the sending terminal detects out that the sending terminal is improperly connected to the receiving terminal, $$\Delta V2 = \frac{1}{2} I1 \times R4;$$

and $\Delta V1 < \Delta V2$, thus Vdct1 < Vdct2.

In order to distinguish between the proper connection and the improper connection, the reference voltage value Vref which is generated by the reference voltage generating circuit is between $\Delta V1$ and $\Delta V2$.

When the sending terminal detects out that the sending terminal is properly connected to the receiving terminal, Vdct<Vref, which means the output terminal OUT of the comparator outputs a low level.

When the sending terminal detects out that the sending terminal is improperly connected to the receiving terminal, Vdct>Vref, which means that the output terminal OUT of the comparator outputs a high level.

As a result, a level signal which is outputted by the output terminal of the comparator indicates whether the sending terminal is properly connected to the receiving terminal.

Figure 4:
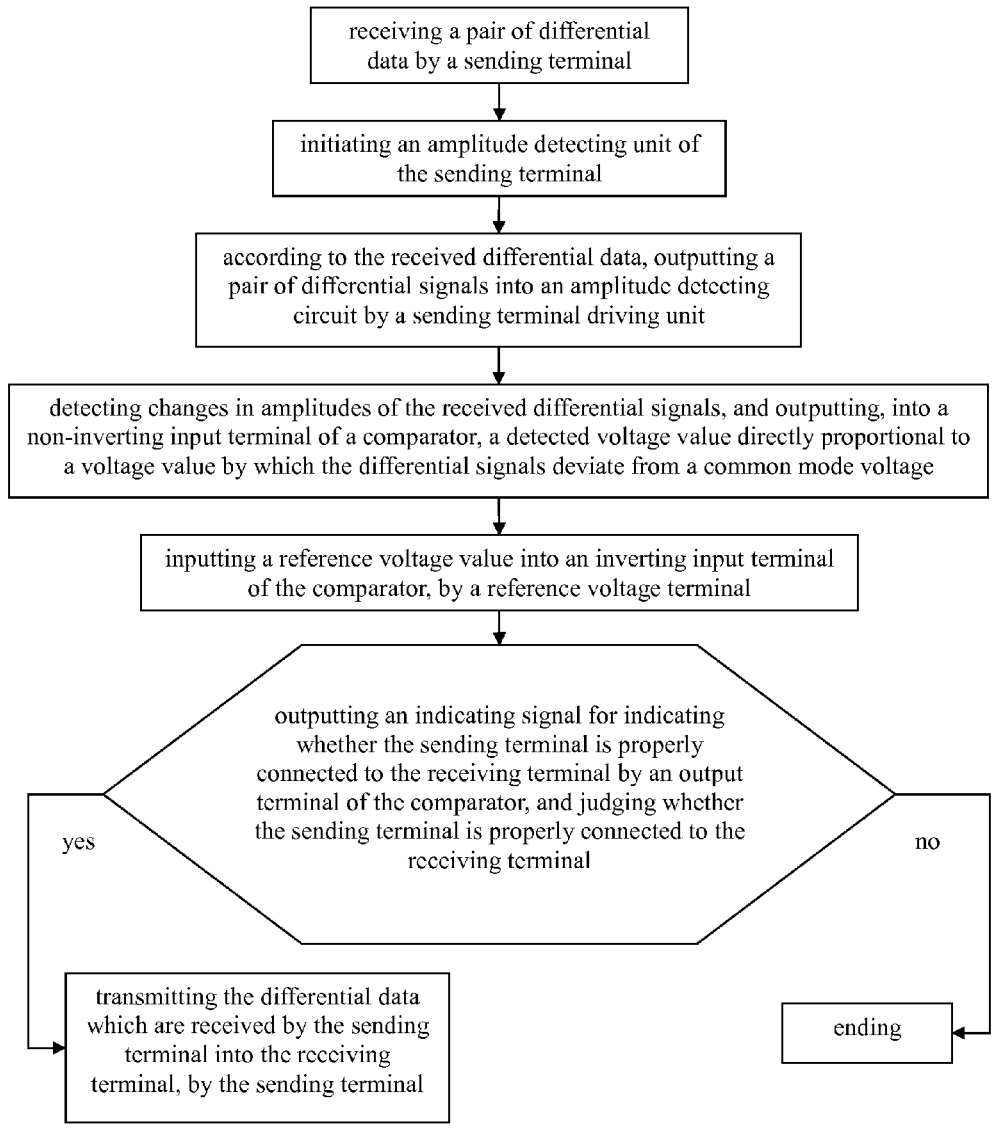
FIG. 4 is a flow chart of a serial data transmission method according to the preferred embodiment of the present invention.

Referring to FIG. 4, according to the preferred embodiment of the present invention, the serial data transmission method comprises steps of:

(1) receiving a pair of differential data DATA_P and DATA_N by a sending terminal, wherein the pair of differential data DATA_P and DATA_N is serial data which need to be transmitted by the sending terminal;

(2) initiating an amplitude detecting unit of the sending terminal, wherein the differential data DATA_P and DATA_N are to-be-detected data having a certain frequency and the frequency of the to-be-detected data is adjusted desirably;

(3) according to the received differential data DATA_P and DATA_N, outputting a pair of differential signal Tx_on and Tx_op into an amplitude detecting circuit of the amplitude detecting unit, by a sending terminal driving unit of the sending terminal;

(4) detecting changes in amplitudes of the received differential signals Tx_on and Tx_op, and outputting a detection voltage into a non-inverting input terminal of a comparator of the amplitude detecting unit, wherein the detection voltage value Vdct is directly proportional to a voltage value $\Delta V$ by which the differential signals Tx_on and Tx_op deviate from a common mode voltage, by the amplitude detecting circuit;

(5) generating a reference voltage value and sending the reference voltage value into a reference voltage terminal Vref by a reference voltage generating circuit; then inputting the reference voltage value into an inverting input terminal of the comparator by the reference voltage terminal Vref;

(6) outputting an indicating signal for indicating whether the sending terminal is properly connected to a receiving terminal by an output terminal of the comparator, and judging whether the sending terminal is properly connected to the receiving terminal; and (7) when the sending terminal is properly connected to the receiving terminal, transmitting the received differential data DATA_P and DATA_N into the receiving terminal by the sending terminal; when the sending terminal is improperly connected to the receiving terminal, ending.

The serial data transmission system and method, provided by the present invention, detect the amplitude changes of the data which are transmitted by the sending terminal, namely the voltage value by which the differential signals Tx_on and Tx_op deviate from the common mode voltage, via the amplitude detecting unit, generate the detection voltage value which is directly proportional to the amplitude changes of the transmitted data, and detect whether the sending terminal is properly connected to the receiving terminal by comparing the detection voltage value with the reference voltage value. Thus the serial data transmission system and method have advantages of a simple structure, high resistance to interference and low power consumption.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A serial data transmission system, comprising:
a sending terminal for sending data,
a receiving terminal for receiving the data which are sent by said sending terminal,
a first connecting capacitor which is connected between said sending terminal and said receiving terminal, and
a second connecting capacitor which is connected between said sending terminal and said receiving terminal;
wherein, said sending terminal comprises a sending terminal driving unit, and an amplitude detecting unit which is connected to said sending terminal driving unit; said sending terminal driving unit outputs a pair of differential signals according to signals of the received data; said amplitude detecting unit detects changes in amplitudes of the differential signals which are outputted by said sending terminal driving unit, and outputs an indicating signal for indicating whether said sending terminal is properly connected to said receiving terminal;
wherein said amplitude detecting unit comprises an amplitude detecting circuit, a reference voltage generating circuit, a reference voltage terminal which is connected to said reference voltage generating circuit and a comparator which is connected to said amplitude detecting circuit and said reference voltage terminal; said amplitude detecting circuit detects the changes in the amplitudes of the differential signals which are outputted by said sending terminal driving unit, and outputs a voltage value into said comparator, wherein said voltage value is directly proportional to the changes in the amplitudes of the differential signals; said comparator compares the voltage value which is outputted by said amplitude detecting circuit with a voltage value of said reference voltage terminal, and outputs the indicating signal for indicating whether said sending terminal is properly connected to said receiving terminal; and said receiving terminal comprises a first resistor which is connected to said first connecting capacitor, and a second resistor which is connected to said second connecting capacitor; and
wherein said sending terminal driving unit comprises a first current source, a first FET which is connected to said first current source, a second FET which is connected to said first current source, a third resistor which is connected to said first FET, and a fourth resistor which is connected to said second FET; said amplitude detecting circuit comprises a fourth current source, a fifth current source, a third FET which is connected to said first FET and said third resistor, a fourth FET which is connected to said second FET and said fourth resistor, an eighth FET, a fifth resistor which is connected to said fourth current source, a sixth resistor which is connected to said fifth current source, a seventh resistor which is connected to said fourth FET, an eighth resistor which is connected to said third FET, a ninth resistor which is connected to said third FET, a tenth resistor which is connected to said fourth FET, a third capacitor which is connected to said fifth resistor, and a fourth capacitor which is connected to said sixth resistor; said reference voltage generating circuit comprises a second current source, a third current source, a fifth FET, a sixth FET which is connected to said fifth FET, a seventh FET which is connected to said fifth FET and said sixth FET, an eleventh resistor which is connected to said fifth FET, a twelfth resistor which is connected to said sixth FET, a thirteenth resistor which is connected to said second current source, a fourteenth resistor which is connected to said third current source, a fifteenth resistor which is connected to said thirteenth resistor, a sixteenth resistor which is connected to said fourteenth resistor, a fifth capacitor which is connected to said fifteenth resistor, and a sixth capacitor which is connected to said sixteenth resistor.

2. The serial data transmission system, as recited in claim 1, wherein, a first terminal of said first current source, a first terminal of said second current source, a first terminal of said third current source, a first terminal of said fourth current source, a first terminal of said fifth current source, a first terminal of said seventh resistor, a first terminal of said eighth resistor, a first terminal of said eleventh resistor and a first terminal of said twelfth resistor are all connected to a power source terminal; a source electrode of said first FET and a source electrode of said second FET are both connected to a second terminal of said first current source; a gate electrode of said first FET and a gate electrode of said second FET together receive a pair of inputted differential data; a drain electrode of said first FET is respectively connected to a first terminal of said third resistor, a first terminal of said first connecting capacitor, a gate electrode of said third FET, and a first terminal of said ninth resistor; a drain electrode of said second FET is respectively connected to a first terminal of said fourth resistor, a first terminal of said second connecting capacitor, a gate electrode of said fourth FET, and a first terminal of said tenth resistor; said drain electrode of said first FET and said drain electrode of said second FET together output a pair of differential signals into said gate electrode of said third FET and said gate electrode of said fourth FET.

3. The serial data transmission system, as recited in claim 2, wherein, a second terminal of said first connecting capacitor is connected to a first terminal of said second resistor; a second terminal of said second connecting capacitor is connected to a first terminal of said first resistor; a drain electrode of said third FET is connected to a second terminal of said eighth resistor; a drain electrode of said fourth FET is connected to a second terminal of said seventh resistor; a source electrode of said third FET, a source electrode of said fourth FET, a drain electrode of said eighth FET, a first terminal of said fifth resistor, a first terminal of said sixth resistor, a first terminal of said third capacitor and a first terminal of said fourth capacitor are all connected to a detection voltage terminal; a second terminal of said fifth resistor is connected to a second terminal of said fourth current source; and a second terminal of said sixth resistor is connected to a second terminal of said fifth current source.

4. The serial data transmission system, as recited in claim 3, wherein a second terminal of said ninth resistor and a second terminal of said tenth resistor together are connected to a gate electrode of said fifth FET and a gate electrode of said sixth FET, and output a common-mode signal into said gate electrode of said fifth FET and said gate electrode of said sixth FET; a drain electrode of said fifth FET is connected to a second terminal of said eleventh resistor; a drain electrode of said sixth FET is connected to a second terminal of said twelfth resistor; a source electrode of said fifth FET, a source electrode of said sixth FET, a drain electrode of said seventh FET, a first terminal of said fifteenth resistor, a first terminal of said sixteenth resistor, a first terminal of said fifth capacitor and a first terminal of said sixth capacitor are connected together.

5. The serial data transmission system, as recited in claim 4, wherein, a gate electrode of said seventh FET is connected to a gate electrode of said eighth FET; said gate electrode of said seventh FET and said gate electrode of said eighth FET are both connected to a voltage terminal; a first terminal of said thirteenth resistor is connected to a second terminal of said second current source; a first terminal of said fourteenth resistor is connected to said second terminal of said third current source; a second terminal of said thirteenth resistor and a second terminal of said fifteenth resistor are both connected to said reference voltage terminal; and a second terminal of said fourteenth resistor is connected to a second terminal of said sixteenth resistor.

6. The serial data transmission system, as recited in claim 5, wherein, a second terminal of said first resistor, a second terminal of said second resistor, a second terminal of said third resistor, a second terminal of said fourth resistor, a second terminal of said third capacitor, a second terminal of said fourth capacitor, a second terminal of said fifth capacitor, a second terminal of said sixth capacitor, a source electrode of said seventh FET and a source electrode of said eighth FET are all connected to a ground terminal; a non-inverting input terminal of said comparator is connected to said detection voltage terminal; an inverting input terminal of said comparator is connected to said reference voltage terminal; an output terminal of said comparator outputs the indicating signal for indicating whether said sending terminal is properly connected to said receiving terminal.

* * * * *